US007515546B2

(12) United States Patent
Gaspard et al.

(10) Patent No.: US 7,515,546 B2
(45) Date of Patent: Apr. 7, 2009

(54) METHOD AND APPARATUS FOR AUTOMATIC DISCOVERY OF NETWORK DEVICES WITH DATA FORWARDING CAPABILITIES

(75) Inventors: Moise Gaspard, Nepean (CA); Philip Andrew Brown, Ottawa (CA); Andre Neil Dominic Jacob, Nepean (CA); Chuong Ngoc Ngo, Ottawa (CA); Denis Proulx, Kanata (CA); Attaullah Zabihi, Ottawa (CA); Afshan Zabihi-Seissan, Kanata (CA)

(73) Assignee: Alcatel-Lucent Canada Inc., Kanata, Ottawa (CA)

( * ) Notice: Subject to any disclaimer, the term of this patent is extended or adjusted under 35 U.S.C. 154(b) by 694 days.

(21) Appl. No.: 10/029,124

(22) Filed: Dec. 19, 2001

(65) Prior Publication Data
US 2003/0112765 A1 Jun. 19, 2003

(51) Int. Cl.
*H04L 12/16* (2006.01)
(52) U.S. Cl. .................. 370/252; 709/223
(58) Field of Classification Search ......... 370/252, 370/352, 353, 354, 355, 356, 389, 392; 709/223, 709/224, 225
See application file for complete search history.

(56) References Cited

U.S. PATENT DOCUMENTS

| 5,175,800 | A | | 12/1992 | Galis et al. | |
|---|---|---|---|---|---|
| 5,491,796 | A | | 2/1996 | Wanderer et al. | |
| 5,500,934 | A | | 3/1996 | Austin et al. | |
| 5,550,816 | A | | 8/1996 | Hardwick et al. | |
| 5,821,937 | A | * | 10/1998 | Tonelli et al. | 715/853 |
| 5,835,720 | A | * | 11/1998 | Nelson et al. | 709/224 |
| 5,838,907 | A | | 11/1998 | Hansen | |
| 5,872,928 | A | | 2/1999 | Lewis et al. | |
| 5,909,549 | A | * | 6/1999 | Compliment et al. | 709/223 |
| 6,061,505 | A | | 5/2000 | Pitchaikani et al. | |
| 6,269,099 | B1 | * | 7/2001 | Borella et al. | 370/389 |
| 6,292,472 | B1 | | 9/2001 | Rariden et al. | |

(Continued)

FOREIGN PATENT DOCUMENTS

EP 0 996 253 A2 4/2000

(Continued)

OTHER PUBLICATIONS

Dupuy et al; Netmate: A Network Management Environment; article; 3-1991, IEEE Network Magazine; pp. 35-43; Mar. 5, 1991, No. 2, New York, US.

*Primary Examiner*—Chi H. Pham
*Assistant Examiner*—Kevin Mew

(57) ABSTRACT

In one embodiment, the present invention sends SNMP queries to sets and/or ranges of IP numbers to determine whether a network device exists at each IP number and whether the network device has IP forwarding capabilities. The set of IP numbers searched may be specified by specifying ranges or subnets or by providing a list of discrete IP numbers. When a new network device with IP forwarding capabilities is discovered, that network device is added to a list of discovered network devices. The list is displayed to the network manager. In one embodiment, in addition to discovering newly added devices via IP number polling, the invention also discovers newly added devices from SNMP messages ("traps") broadcast by a newly added device. In one embodiment, each network device discovered as a result of a SNMP trap is added to the newly discovered device list.

36 Claims, 5 Drawing Sheets

U.S. PATENT DOCUMENTS

| | | | |
|---|---|---|---|
| 6,377,987 B1* | 4/2002 | Kracht | 709/220 |
| 6,381,237 B1 | 4/2002 | Lam et al. | |
| 6,496,859 B2* | 12/2002 | Roy et al. | 709/223 |
| 6,516,345 B1* | 2/2003 | Kracht | 709/220 |
| 6,570,867 B1 | 5/2003 | Robinson et al. | |
| 6,584,503 B1* | 6/2003 | Carney et al. | 709/224 |
| 6,611,863 B1* | 8/2003 | Banginwar | 709/220 |
| 6,636,499 B1* | 10/2003 | Dowling | 370/338 |
| 6,772,204 B1 | 8/2004 | Hansen | |
| 6,791,981 B1* | 9/2004 | Novaes | 370/390 |
| 6,834,298 B1* | 12/2004 | Singer et al. | 709/220 |
| 6,847,614 B2* | 1/2005 | Banker et al. | 370/252 |
| 6,891,793 B1 | 5/2005 | Suzuki et al. | |
| 6,895,433 B1* | 5/2005 | Slater et al. | 709/220 |
| 6,912,587 B1 | 6/2005 | O'Neil | |
| 6,917,626 B1* | 7/2005 | Duvvury | 370/466 |
| 7,003,567 B2* | 2/2006 | Suzuki et al. | 709/224 |
| 7,024,199 B1* | 4/2006 | Massie et al. | 455/445 |
| 7,024,476 B1* | 4/2006 | Page et al. | 709/224 |
| 7,136,357 B2* | 11/2006 | Soumiya et al. | 370/236 |
| 7,240,106 B2* | 7/2007 | Cochran et al. | 709/222 |
| 7,269,648 B1* | 9/2007 | Krishnan et al. | 709/224 |
| 2002/0032761 A1* | 3/2002 | Aoyagi et al. | 709/223 |
| 2002/0091824 A1* | 7/2002 | Anderson et al. | 709/225 |
| 2002/0165961 A1* | 11/2002 | Everdell et al. | 709/225 |
| 2002/0165978 A1 | 11/2002 | Chui | |
| 2002/0169884 A1* | 11/2002 | Jean et al. | 709/230 |
| 2003/0009546 A1* | 1/2003 | Benfield et al. | 709/223 |
| 2003/0097438 A1* | 5/2003 | Bearden et al. | 709/224 |
| 2003/0154271 A1* | 8/2003 | Baldwin et al. | 709/223 |
| 2003/0167327 A1* | 9/2003 | Baldwin et al. | 709/225 |

FOREIGN PATENT DOCUMENTS

| | | |
|---|---|---|
| EP | 0 996 253 A3 | 4/2000 |
| WO | WO 92/05485 | 4/1992 |

* cited by examiner

METHOD AND APPARATUS FOR AUTOMATIC DISCOVERY OF NETWORK DEVICES WITH DATA FORWARDING CAPABILITIES

FIELD OF THE INVENTION

The present invention relates to the field of data communications networks, and more particularly to a method and apparatus for automatically discovering network devices that have data forwarding capabilities.

BACKGROUND OF THE INVENTION

A data communications network transmits data among and between network devices (sometimes also referred to as "network elements" or "nodes") physically and logically connected to the network. The physical configuration of a network changes as network devices are added or removed from the network and as physical connections between devices are made or changed. The logical configuration of a network changes as logical connections are established between communicating network devices utilizing the physical structure of the network. Network devices include devices that can send and/or receive data, as well as devices that can forward data. Network devices that can forward data are important in all but the very simplest networks. In most networks direct connections do not exist between most network devices. Instead, each network device is connected to a limited number of adjacent network devices. For network devices to be able to communicate when they are not physically connected, the two communicating network devices rely on intermediate network devices to forward communications between them.

Data is commonly transmitted over a data communications network in the form of discrete chunks of data referred to as "packets". A string of data is broken up into packets at the sending network device and sent separately over the network to the receiving network device. The network device receives the individual packets and assembles them in the correct order to reconstruct the original data string. The particular manner in which packets are broken up and transmitted from one network device to another is defined as a "network protocol". One prominent network protocol is the "Internet Protocol", usually referred to by its acronym, "IP", or as the "IP protocol." Another protocol is called "Multi-Protocol Label Switching", or "MPLS".

Data communications networks are often conceptualized as comprising a hierarchy of communications "layers" that establish different types of connections between network devices. The more basic functions are provided at the lower layers, while successively more sophisticated functions are provided at successively higher layers. Different protocols are used to communicate between devices on each layer. Layering allows sophisticated communications functions to be built up using relatively simple protocols at each layer.

One common hierarchical network model is the so-called OSI "seven-layer" model. In the OSI model, each lower layer in the model provides communications capabilities or functions that are utilized by the next higher layer. A schematic illustration of the OSI seven-layer model is shown in FIG. 2. As shown in FIG. 2, the seven layers in the OSI model, beginning from the bottom, are physical layer 205, data link layer 210, network layer 215, transport layer 220, session layer 225, presentation layer 230, and application layer 235. In relation to the OSI model, the IP protocol is commonly considered as being associated with the third layer, network layer 215.

In an IP network, each sending and receiving device is assigned a 32-bit address. The address is usually written as a series of four "octets" (e.g., numbers within a range of 0-255) separated by periods. Examples of IP addresses are 127.0.0.1, 205.160.34.112, 23.1.99.244, etc.

Each IP packet sent over an IP network includes the sender's IP address and the recipient's IP address. The recipient's IP address is used to route the packet from the sending network device via intermediate network devices that have IP forwarding capabilities to the recipient network device.

An example of a simple network that illustrates IP forwarding is shown in FIG. 1. The network of FIG. 1 includes two types of network devices: non-IP-forwarding devices 105, 110, 115 and 120 (represented by rectangles in FIG. 1 and which may, for example, comprise personal computers or computer workstations), and IP-forwarding devices 125, 130, 135, 140, 145 and 150 (represented by circles in FIG. 1 and which may, for example, comprise IP routers). The network devices in FIG. 1 are interconnected by a various bi-directional connections or links 160, 162, 164, 166, 168, 170, 172, 174, 176, 178 and 180, represented in FIG. 1 by two-headed arrows. Links 160-180 may comprise direct physical connections between the adjacent network devices, or may comprise logical connections that involve intermediate devices but that are seen by the connected devices as direct connections. For example, network device 110 is connected to network device 130 via link 166. That is, network device 110 knows that if it sends a communication via its interface port that is connected to link 166, the communication will be received by network device 130. It doesn't matter to network device 110 whether link 166 is a single physical connection or a series of physical connections. Logical links such as links 160-180 in FIG. 1 that connect two network devices will be referred to sometimes herein as "IP links". The term "IP links" as used herein includes logical links that use the IP protocol, as well as logical links utilizing other protocols, such as, for example, MPLS.

In the example network of FIG. 1, network device 110 is connected directly (via link 166) only to network device 130. For network device 110 to communicate to any other network device, the IP forwarding capabilities of network device 130 must be used.

In FIG. 1, network device 130 has direct connections to three other network devices in addition to network device 110, to which it is connected via link 166. The other links are links 160, 168 and 176, which connect network device 130 to network devices 125, 135 and 145, respectively. Each of links 160, 166, 168 and 176 are typically connected to separate ports on network device 130. Each port may be a separate physical interface, or two or more ports may share a single physical interface. Each port may have its own IP address assigned to it. In that case, network device 130, as well of each of its ports, may have distinct IP addresses.

Network device 130 of FIG. 1 has been defined to have IP forwarding capabilities. That means it must be able to receive an IP packet (intended for delivery to a network device other than network device 130) from one of the IP links it is connected to and forward it along at least one of the other the IP links it is connected to. In the general case where network device 130 is a typical router, network device 130 will be able to receive and forward IP packets from and to any of the IP links 160, 166, 168 and 176 it is connected to (provided the links are functioning). The other network devices 125, 135, 140, 145 and 150 with IP forwarding capabilities in the example of FIG. 1 are similarly able to receive and forward IP packets from and to any of the IP links they are connected to.

If network device 110 wants to send a communication to, for example, network device 115, there are a number of paths that the communication can take. The most direct path comprises links 166, 176, and 178. However, other paths include the path comprising links 166, 168, 174, 180 and 178, and even the path comprising links 166, 160, 162, 174, 180 and 178.

When network device 110 sends out IP packets to network device 115, it does not know what path each of the packets will take. Network device 110 simply addresses the packet to network device 115 using network device 115's IP number (namely 129.111.110.9 in the example of FIG. 1), and sends it out over link 166 towards network device 130.

What network device 130 does with the packet after it receives it depends on how network device 130 is configured. For example, network device 130 may be configured to forward any packet received from link 166 along link 176. Alternatively, network device 130 may be configured to forward packets along links depending on the destination IP number of the packet. Network device 130 may also be programmed to monitor traffic along each link and to adapt its forwarding scheme to traffic conditions.

How each network device forwards packets depends on the capabilities and configuration of the particular network device. As is evident even from the simple network example of FIG. 1, it is important that network devices that do IP forwarding be properly configured to interoperate with each other to ensure that packets are correctly routed to their destination.

Configuration of network devices within a network comprises an aspect of network management. Network devices may be locally managed or remotely (centrally) managed. Local management of a network device may be accomplished using a workstation or terminal directly connected to the network device. Remote management of a network device may be accomplished from remote terminals or workstations that communicate with the network device via the network, provided the network device is provided with a management protocol that allows remote management. One protocol used for remote management of network devices is the Simple Network Management Protocol (SNMP). SNMP provides a set of commands and parameters that allow communication with and configuration of network devices. A person who is responsible for management of a network is commonly referred to as a "network manager." Network management software systems provide tools to network managers that facilitate central management of often geographically dispersed network devices.

To be able to manage a network device, a network manager must know that the network device exists, how it is connected to the network and to other network devices, and what its capabilities are. In addition, the network device must have the capability of being remotely managed, the network management system used by the network manager must be able to communicate with the network device using the correct protocol, and the network manager must be apply to supply any required logins, passwords, or other security information.

The configuration of large networks often changes through the addition, removal and/or replacement of network devices. To properly manage large networks to ensure that IP packets are routed correctly over the network, the network manager must know when data forwarding network devices are added or removed.

In small local networks, for example those in which the entire network comprises only a handful of network devices, it is relatively easy for a network manager to physically inspect each network device and know from first hand inspection when a network device is added or removed. In large, geographically dispersed networks comprising hundreds of network devices, it would be extremely difficult for the network manager to know from a first hand inspection what the state of the entire network is at any given time.

A network being managed often comprises of a plurality of subnets. A subnet is a group of network devices belonging to a specific block or subset of IP addresses. For example, one type of subnet comprises IP numbers that share the first three octets, as for example 215.223.46.x (where "x" can be any number from 0 to 255). Larger subnets may share only the first two octets (e.g. 215.223.x.y). In addition to subnets, networks may also include individual IP numbers or ranges of IP numbers. A network manager generally will know which subnets are included in the network being managed. However, the network manager will not necessarily know beforehand the IP number of a network device to be added to a network, particularly if the IP number is not within one of the network's known subnets.

Some prior art network management systems provide tools that allow a network manager to gather certain information about network devices within the network managed by the network manager. For example, one prior art system allows a network manager to send queries to each possible IP number in a subnet or other range of IP numbers ("IP number polling") to determine whether a network device is associated with that IP number. If a network device is found, it is automatically added to the network management system's database of managed network devices. This prior art network device discovery system can discover newly added network devices. However, it does not distinguish between network devices with IP forwarding capabilities and those without. Furthermore, it does not discover network devices outside of the range of IP numbers being searched, nor does it allow a network manager to exert control over which of the newly discovered network devices are to be managed by the network management system.

SUMMARY OF THE INVENTION

The present invention comprises a method and apparatus for automatic discovery of network devices with data forwarding capabilities. In one embodiment, the present invention sends SNMP queries to sets and/or ranges of IP numbers to determine whether a network device exists at each IP number and whether the network device has IP forwarding capabilities. The set of IP numbers searched may be specified by specifying ranges or subnets or by providing a list of discrete IP numbers. When a new network device with IP forwarding capabilities is discovered, that network device (identified by its IP number and SNMP description field) is added to a list of discovered network devices. The list is displayed to the network manager, who has the option of selecting none, one, or more than one of the network devices on the network device list for management by the network manager's network management system. In one embodiment, in addition to discovering newly added devices via IP number polling, the invention also discovers newly added devices from SNMP messages ("traps") broadcast by a newly added device. In one embodiment, each network device discovered as a result of a SNMP trap is added to the newly discovered device list, regardless of whether or not the network device has data forwarding capabilities.

DESCRIPTION OF THE PREFERRED EMBODIMENT

A method and apparatus for automatically discovering network devices with data forwarding capabilities is presented. In one or more embodiments, the invention comprises part of a network management system, such as, for example, the Alcatel 5620 Network Management System. In one or more embodiments, the invention is implemented by means of software programming operating on personal computers, computer workstations and or other computing platforms. In the following description, numerous specific details are set forth to provide a thorough description of the invention. However, it will be apparent to one skilled in the art that the invention may be practiced without these specific details. In other instances, well-known features have not been described in detail so as not to obscure the invention.

Figure 1:
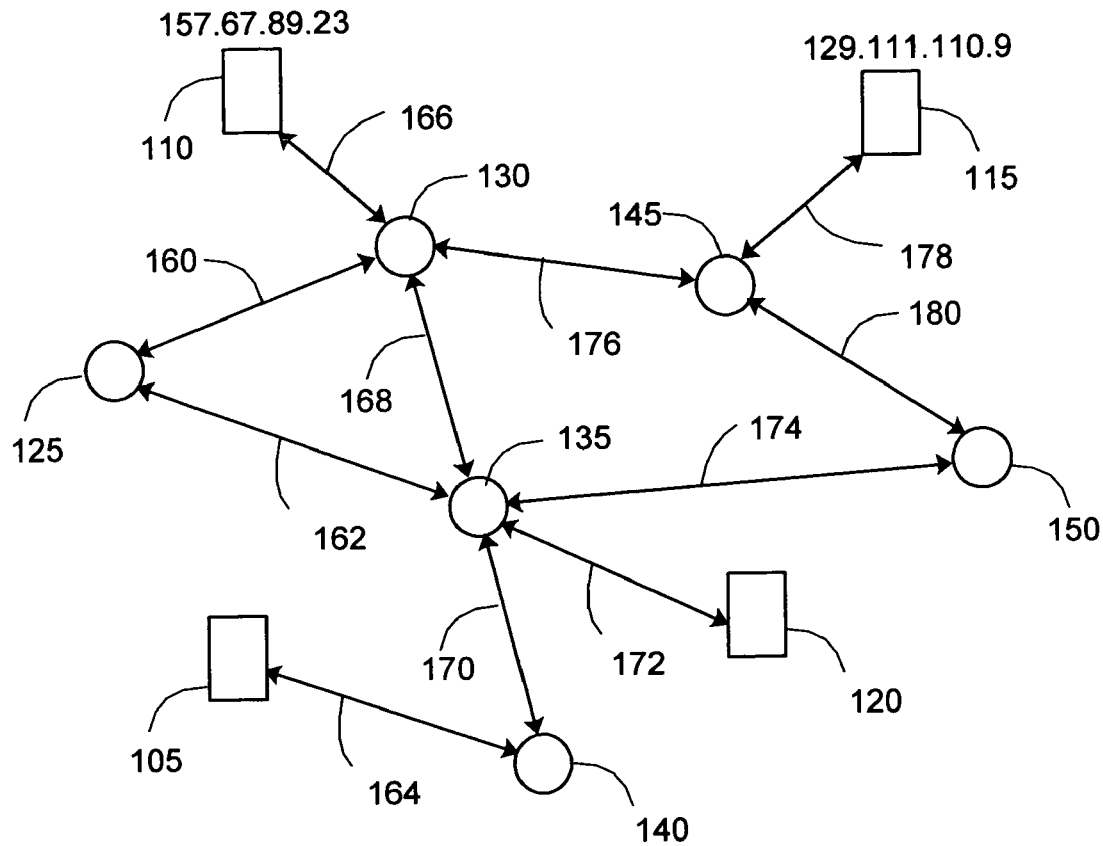
FIG. 1 is a schematic of a data communications network that utilizes data forwarding.
Figure 2:
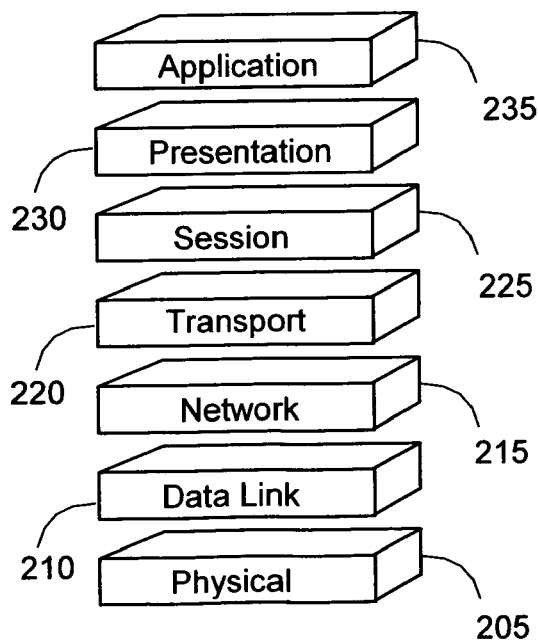
FIG. 2 is a schematic of the OSI seven layer network model.
Figure 3:
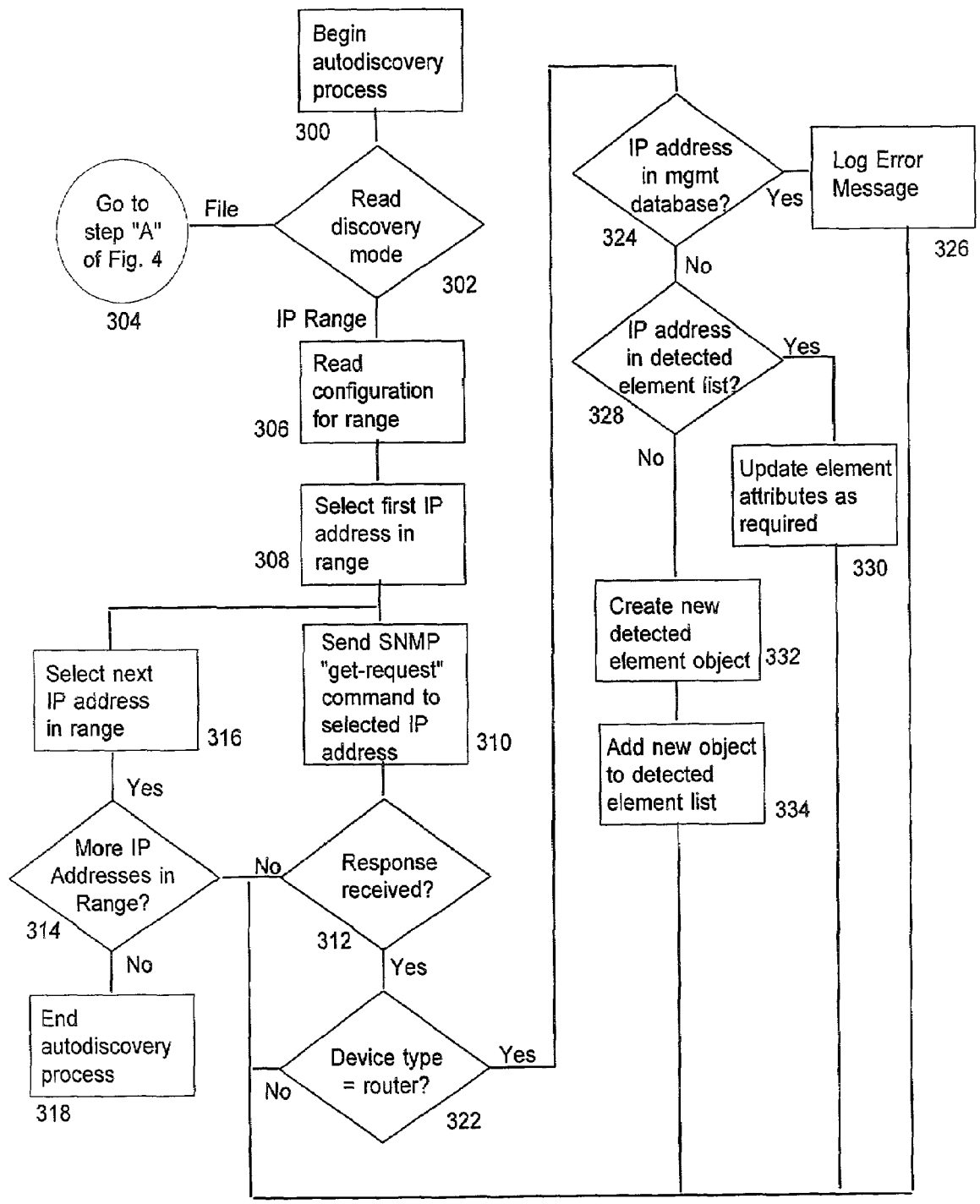
FIG. 3 is a flow chart showing an auto discovery process used in an embodiment of the invention.

FIG. 3 is a flow chart showing an auto discovery process used in an embodiment of the invention. This embodiment forms part of a network management system (NM) that comprises a number of tools to allow a network manager (user) to manage routing devices in a network environment. The NM provides a graphical user interface (GUI) that displays various views of the network and devices being managed, and that provides menus from which the network manager can select various network management operations. In one embodiment, the views that a user may select include a "physical map" that shows a graphical representation of the physical devices and connections in the network being managed (e.g., OSI layers 1 and 2) and an "IP map" that shows a graphical representation of network devices and connections at a higher layer (e.g., OSI layer 3). One of the operations that may be selected is the auto discovery process of FIG. 3.

As shown in FIG. 3, the process starts by a user launching the auto discovery process at step 300 (for example by selecting a "Discover" command from a pull-down menu). At step 302, the discovery mode selected by the user is identified. In the embodiment of FIG. 3, the user can select either an "IP range" mode or a "configuration file" mode. In the "IP range" mode, the discovery process searches IP numbers within ranges specified by the user. In the "configuration file" mode, the discovery process searches IP numbers listed in a user supplied configuration file.

If the selected discovery mode is the "IP range" mode, the configuration information specified by the user for the IP range(s) to be searched is read at step 306. In one embodiment, the configuration information for a range includes a starting IP address, an ending IP address, and SNMP information. The SNMP information includes the SNMP read community string, the remote port number to be used to connect to the SNMP agent at each IP address, a timeout value, a retry value, and a SNMP version number.

After the configuration information for the current range is read at step 306, the first IP number in the range is selected at step 308. A SNMP "get-request" command is sent to the selected IP number at step 310 using the SNMP configuration parameters identified at step 306. A SNMP "get request" command is a request to the SNMP agent at the queried IP address to respond with identification information for any network device at that IP address.

At step 312 a determination is made as to whether a response from the queried IP address has been received within timeout and retry limits specified in the configuration information.

If no response is received within the applicable timeout and retry limits, a determination is made at step 314 as to whether the end of the IP range being searched has been reached. If the end of the IP range has not been reached, the process selects the next IP number in the range at step 316 and returns to step 310. If the end of the IP range has been reached, the auto discovery process ends at step 318. Alternatively, in embodiments in which a user may specify multiple IP ranges, instead of ending at step 318, the process may go on to the next range and return to step 306.

If a response to the SNMP "get request" message is received at step 312, the response is inspected to see whether the SNMP reply identifies the responding device type as a router. If the device type specified in the SNMP reply is not a router, the process returns to step 314.

If the device type specified in the SNMP reply is a router, a determination is made at step 324 as to whether the IP number for the responding device is already included in a managed devices database of the NM. The managed devices database is a database of all network devices that are currently being managed by the NM. If the IP number is already in the managed devices database, an error message is logged at step 326 and the process returns to step 314. The error message indicates that the device discovered at the current IP number is already in the managed devices database. While the message is referred to as an error message, the message need not connote the occurrence of an error, but may simply serve as an indication of the discovery or re-discovery of a device already in the managed devices database.

If the current IP number is not in the managed devices database, a determination is made at step 328 as to whether the current IP address is already in the detected element list. The detected element list is a list of detected devices that have not yet been selected by the user to be managed by the NM. In one embodiment, the detected element list is persistent and cumulative, so that results of previous executions of the discovery process remain in the detected element list unless selected for management or deleted by the user. If the current IP address is already in the detected element list, the detected element's parameters as listed in the detected element list are compared to the parameters received in the response to the sent "get-request" command and updated as required at step 330. The process then returns to step 314.

If the current IP number is not in the detected element list, a new detected element having the parameters contained in the response to the "get-request" command is created at step 332. The new detected element is then added to the detected element list at step 334, and the process returns to step 314.

Figure 4:
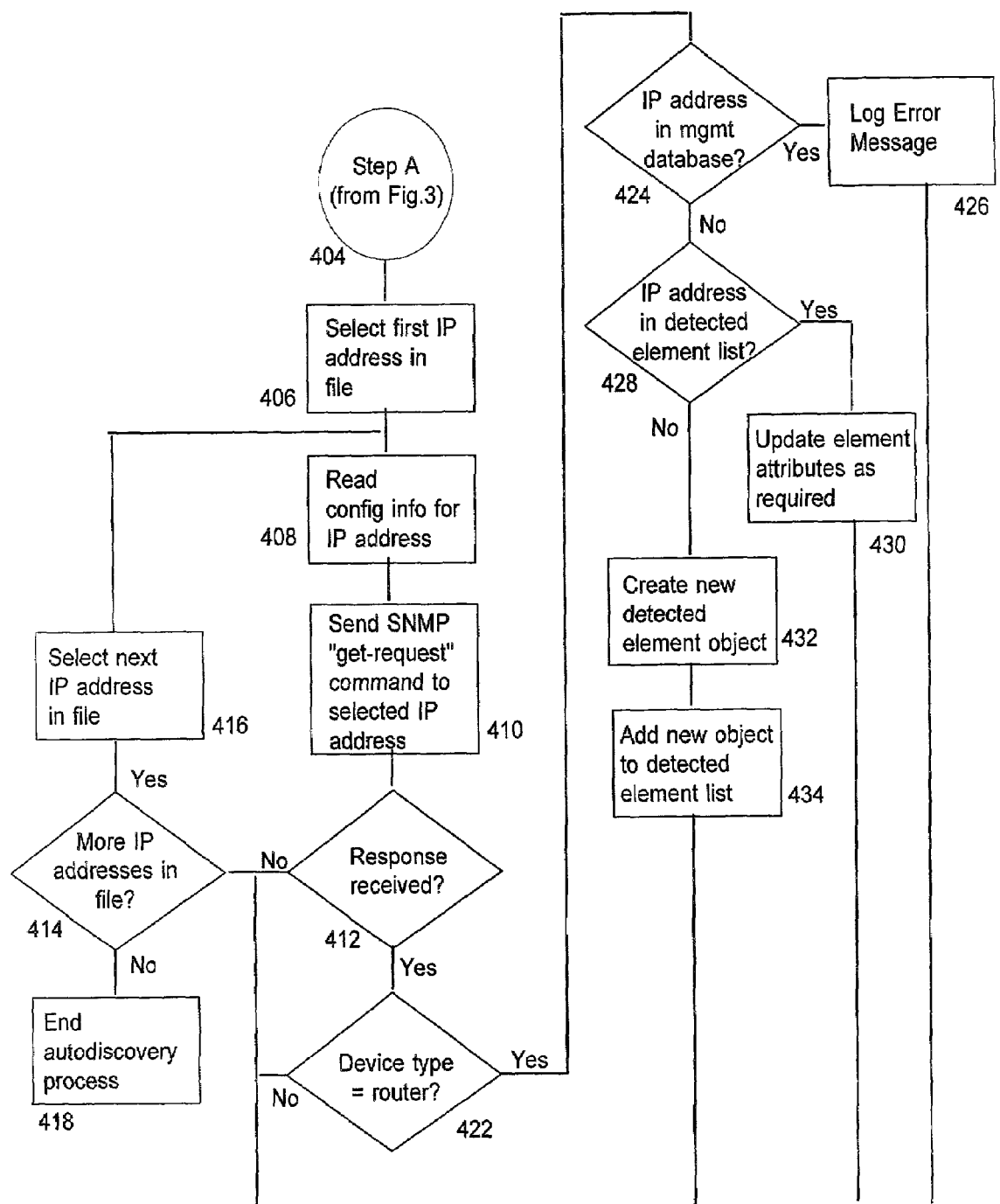
FIG. 4 is a flow chart showing an auto discovery process used in an embodiment of the invention.

Going back to step 302, if the discovery mode specified by the user is "configuration file", the process proceeds to the step 404 of FIG. 4.

The auto discovery process for the configuration file mode shown in FIG. 4 is nearly identical to the auto discovery process for the IP range mode shown in FIG. 3, except that instead of incrementing through a range of IP numbers, the process increments through a user-supplied list of discrete IP numbers. On one embodiment, the configuration file contains a list of discrete IP numbers together with SNMP configuration parameters for each listed IP number.

From step 404 in FIG. 4, the process proceeds to step 406, where the first IP address in the configuration file is selected. At step 408, the corresponding SNMP parameters are read from the configuration file. In one embodiment, the SNMP configuration information for each IP number in the configuration file includes the SNMP read community string, the remote port number to be used to connect to the SNMP agent at that IP address, a timeout value, a retry value, and a SNMP version number. In one embodiment default values are used for any SNMP parameter missing from the configuration file.

After the configuration information for the current IP number is read at step 408, a SNMP "get-request" command is sent to the selected IP number at step 410 using the SNMP configuration parameters identified at step 406.

At step 412 a determination is made as to whether a response from the queried IP address has been received within timeout and retry limits specified in configuration parameters.

If no response is received within the applicable timeout and retry limits, a determination is made at step 414 as to whether the end of the configuration file has been reached. If the end of configuration file has not been reached, the process selects the next IP number in the configuration file and returns to step 408. If the end of the configuration has been reached, the auto discovery process ends at step 418.

If a response to the SNMP "get request" message is received at step 412, the response is inspected to see whether the SNMP reply identifies the responding device type as router. If the device type specified in the SNMP reply is not a router, the process returns to step 414.

If the device type specified in the SNMP reply is a router, the process at step 424 checks to see whether the IP number for the responding device is already included in the managed devices database of the NM. If the IP number is already in the managed devices database, an error message is logged at step 426 and the process returns to step 414. The error message indicates that the device discovered at the current IP number is already in the managed devices database. While the message is referred to as an error message, the message need not connote the occurrence of an error, but may simply serve as an indication of the discovery or re-discovery of a device already in the managed devices database.

If the current IP number is not in the managed devices database, a determination is made at step 428 as to whether the current IP address is already in the detected element list. If the current IP address is already in the detected element list, the detected element's parameters as listed in the detected element list are compared to the parameters received in the response to the sent "get-request" command and updated as required at step 430. The process then returns to step 414.

If the current IP number is not in the detected element list, a new detected element having the parameters contained in the response to the "get-request" command is created at step 432. The new detected element is then added to the detected element list at step 434, and the process returns to step 414.

In addition to the manually invoked discovery function of FIGS. 3 and 4, one or more embodiments of the invention comprise a discovery function that is automatically invoked via receipt of a SNMP notification by the NM. An embodiment of an auto discovery process invoked by a SNMP notification is shown in FIG. 5.

Figure 5:
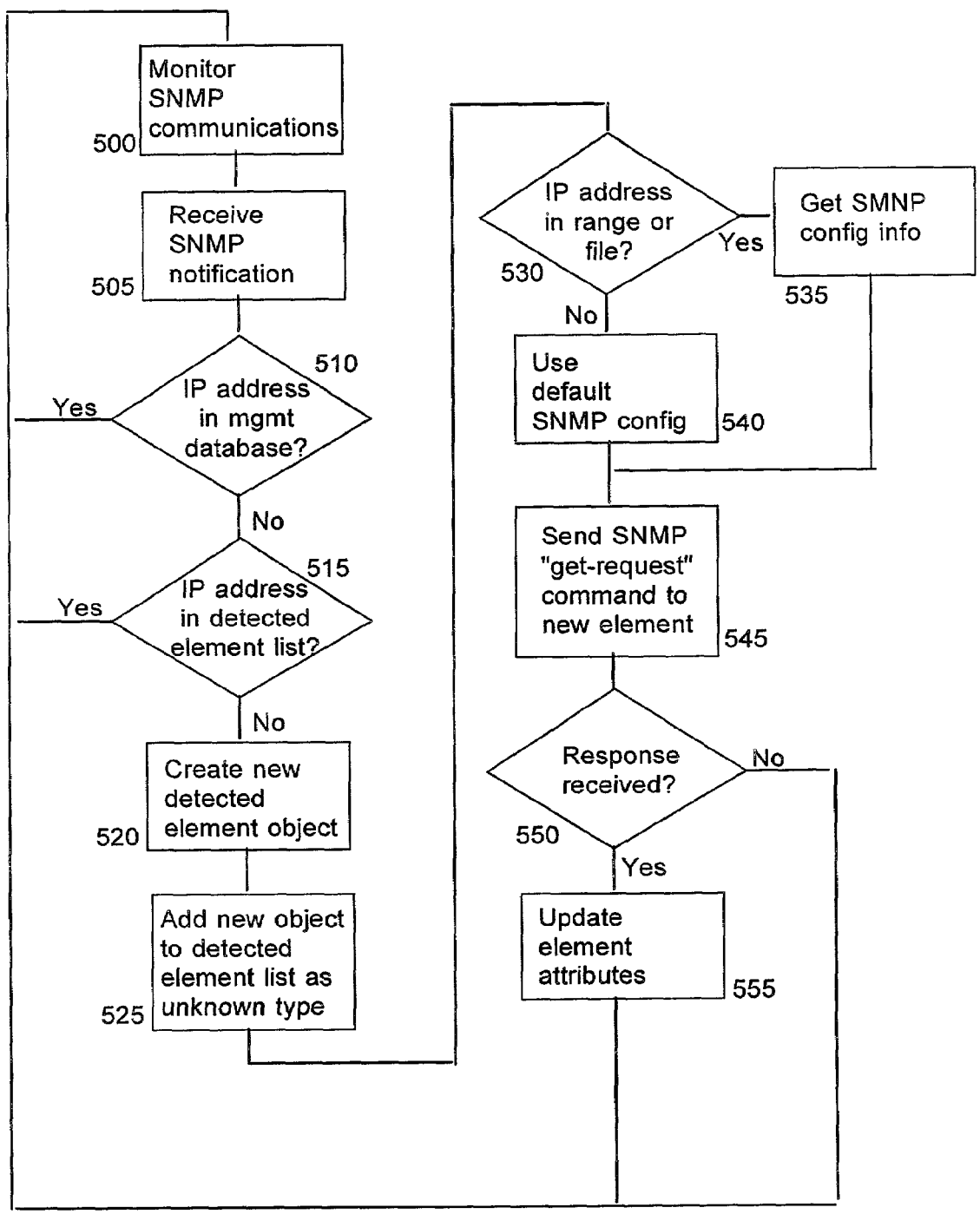
FIG. 5 is a flow chart showing an auto discovery process used in an embodiment of the invention.

In the embodiment of FIG. 5, the SNMP port of the workstation or other system on which the NM is running is monitored at step 500 for SNMP notifications sent to the NM from SNMP network devices. Such notifications are sometimes referred to as SNMP "traps". A network device may be configured to send a SNMP trap to the NM if the device is intended to be managed by the NM. In that case, the person installing and configuring the device may configure it to send the NM a SNMP trap once the device is installed on the network, when the device boots up, or at some other time or times.

When a SNMP notification is received at step 505, a determination is made at step 510 as to whether the IP address of the device sending the SNMP notification is already contained in the NM's managed devices database. If the device is already included in the managed devices database, the process returns to step 500.

If the device is not already contained in the managed devices database, a determination is made at step 515 as to whether the IP address of the device is already in the NM's detected element list. If the device is already included in the detected element list, the process returns to step 500.

If the device is not already in the detected element list, a new detected element object is created in step 520, and the new object, representing the new device, is added to the detected element list at step 525. At this point the "type" attribute of the detected element object is specified as being "unknown."

At step 530, a determination is made as to whether the IP address for the device is included in a user specified auto discovery IP range or configuration file. If it is, the corresponding SMNP configuration parameters are extracted at step 535, and a SNMP "get-request" message is sent to the device using the extracted SNMP configuration parameters at step 545. If the IP address is not in an existing IP range or configuration file, default SNMP configuration parameters are obtained at step 540 and used for the SNMP "get-request" sent to the device at step 545.

At step 550, a determination is made as to whether a response to the SNMP "get-request" message has been received within the applicable timeout and retry limits. If no response is received, the process returns to step 500. If a response is received, the attributes of the detected element object are updated with information from the response at step 555. For example, if the response identifies the detected device as a router, the type attribute of the detected element object is changed from "unknown" to "router." After the detected element object attributes are updated as appropriate at step 555, the process returns to step 500.

In one embodiment, the auto discovery process is launched from a graphic user interface referred to as an "Auto Discovery Window". In one embodiment, the Auto Discovery Window comprises two panes. A top pane displays the IP range(s) or addresses to search, and the bottom pane displays the discovered elements. A menu bar provides access to various functions associated with the Auto Discovery Window.

TABLE 1

| First level menu | Second level menu | Description |
| --- | --- | --- |
| File | Exit | Closes the Auto Discovery Window. |
| Range | New | Displays a form enabling the user to create and configure a new range. |
|  | Edit | Displays a form enabling the user to edit the configuration of the selected range. This menu item is grayed out if no range is selected or if the selected range is actively discovering routing devices. Only single selection is supported for this command. |
|  | Delete | Deletes the selected Range. This command is grayed out if no range is selected or if the selected range(s) are actively discovering routing devices. |

TABLE 1-continued

| First level menu | Second level menu | Description |
|---|---|---|
| | Discover | Starts discovering supported routing devices for the selected range(s). This command is grayed out if no range is selected or if the selected range(s) are already discovering routing devices. |
| | Cancel | Stops discovering routing devices for the selected range(s). This command is grayed out if no range is selected or if the selected range(s) are not actively discovering routing devices. |
| | Log | Displays the associated log file for the selected range. This command is grayed out for the following reasons: No range is selected More than one range is selected No log file exists (A Discovery has never occurred for this range.) The selected range is actively discovering network elements. |
| Element | Manage | Commits a Detected Network Element for management within the 5620. This command is grayed out if no Detected Network Element is selected or if the selected element(s) are not routing devices. |
| | View Configuration | Displays a form containing the configuration of the Detected Network Element. This command is grayed out if no Detected Network Element is selected. Only single selection is supported for this command. |
| | Delete | Deletes the selected Detected Network Elements. This command is grayed out if no element is selected or if the selected element(s) are in the process of being committed for management within the 5620. |
| View | Refresh | Refreshes the information displayed within the Auto Discovery Window. |
| Help | | Display appropriate help page in a browser |

Table 1 lists the menu commands available to a user in the Auto Discovery Window in an embodiment of the invention.

The first column of Table 1 lists the first level menu commands. These are the commands that are normally displayed on the menu bar when no command has been selected. In the embodiment of Table 1, the available first level commands comprise "File", "Range", "Element", "View" and "Help". Selecting one of the first level menu commands displays a pull down menu of corresponding second level menu commands.

Under the "File" first level command, the second level command "Exit" is available. Selecting the "Exit" command closes the auto discovery window.

Under the "Range" first level command, the second level commands "New", "Edit", "Delete", "Discover", "Cancel" and "Log" are available.

Selecting the "New" command displays a form that allows the user to configure a new IP range for auto discovery. Table 2 shows the fields that are displayed in an IP range form in an embodiment of the invention.

TABLE 2

| Field | Required | Range | Default | Description |
|---|---|---|---|---|
| Starting IP Address | YES | Class A to C. No Loopback or broadcast addresses. | 0.0.0.0 | The starting point for the Discovery |
| Ending IP Address | YES | Class A to C. No Loopback or broadcast addresses. | 0.0.0.0 | The ending point for the Discovery |
| SNMP Read Community | YES | Any valid string. | "public" | The SNMP Read community string. Only one community string can be specified per IP range. |
| Remote Port | YES | 1-64K | 161 | Remote port number to use to connect to the SNMP agent at each IP address. |
| Timeout | YES | Any valid positive integer including zero. | 5000 | SNMP Timeout value (ms) |
| Retries | YES | Any valid positive integer including zero. | 3 | Number of times to attempt to connect to the SNMP agent at each IP address. |
| SNMP Version | YES | v1, v2c | v1 | Version of the SNMP Agent. |

The IP range form of Table 2 comprises seven fields: "Starting IP Address", "Ending IP Address", "SNMP Read Community", "Remote Port", "Timeout", "Retries" and "SNMP Version." As shown in Table 2, all fields must contain values. Default values are supplied which are used if the user does not enter new values.

In some embodiments, the "New" command also allows the creation of a range of discrete IP numbers imported from a file. The file contains the parameters for each IP number shown in Table two, with the exception of the beginning and ending range addresses.

Turning back to Table 1, the next second level command available under the "Range" first level command is "Edit". Selecting the "Edit" command displays a form that allows a user to edit the configuration of a selected range (i.e. if the user has selected a range from the IP range pane of the auto discovery window) using a form with the same fields as in Table 2. The "Edit" command is grayed out (making it not available to the user) if no range has been selected. Only one range at a time may be selected to use the "Edit" command.

The third second level command available under "Range" is "Delete". Selecting the "Delete" command deletes the selected range(s). The "Delete" command is grayed out if no range is selected.

The fourth command available under "Range" is "Discover". Selecting the "Discover" command begins the auto discovery process for the selected range(s). The "Discover" command is grayed out if no range is selected.

The fifth command available under "Range" is "Cancel." Selecting the "Cancel" command stops the auto discovery process for the selected range(s). The "Cancel" command is grayed out if no range is selected or if no discovery process is taking place for the selected range(s).

The sixth and last second level command available under "Range" is "Log". Selecting the "Log" command displays an associated log file for the selected range. The "Log" command is grayed out under any of the following circumstances:

(a) No range is selected.

(b) More than one range is selected.

(c) No log file exists (no discovery process has yet taken place for the range).

(d) A discovery process for the range is actively taking place.

The next first level command after "Range" is "Element". The second level commands available under "Element" include "Manage", "View Configuration" and "Delete."

The "Manage" command selects a discovered element from the discovered element list for management by the NM (also referred to as "committing" the selected element). In one embodiment, once an element is committed, the NM validates the element and displays the element in the NM's physical and logical network maps. The committed element is also removed from the detected element list. The "Manage" element is grayed out if no detected element is selected or if the selected element(s) are not IP forwarding (routing) devices.

The "View Configuration" command displays a form containing configuration information available for the selected element (the available information may include items not included in the information displayed in the detected element list). Table 3 shows the information displayed in an embodiment of the invention. The "View Configuration" command is grayed out if no element is selected.

TABLE 3

| Column | Values | Default | Description |
|---|---|---|---|
| IP | N/A | IP Address of the device. | The IP address of the Detected Network Element. |
| Type | Unknown Routing Non-routing Unsupported CPSS | Unknown | The type of Detected Network Element. |
| Commit Status | Not Committed Requested In Progress Not Applicable Not Available | Not Committed | The management status of the Detected Network Element. Those network elements that are not to be managed through Auto Discovery have the "Not Applicable" status. A "Not Available" status is displayed if there is a failure to communicate with the network element. |
| SNMP Version | v1 v2c | v1 | The SNMP version used to communicate with the Detected Network Element. |
| SNMP Read Community String | N/A | "public" | The SNMP Read Community String. |
| SNMP Description | N/A | The SNMP Description of the device, | The SNMP Description of the network element. |

The final second level command available under "Element" is "Delete". Selecting the "Delete" command deletes the selected element. The "Delete" command is grayed out if no element or more than one element are selected.

The two final first level menu commands are "View" and "Help". Selecting the "View" command displays a single second level command, "Refresh", that causes the information displayed in the Auto Discovery Window to be updated. Selecting the "Help" first level command displays a help information, for example via a help page in a browser.

Figure 6:
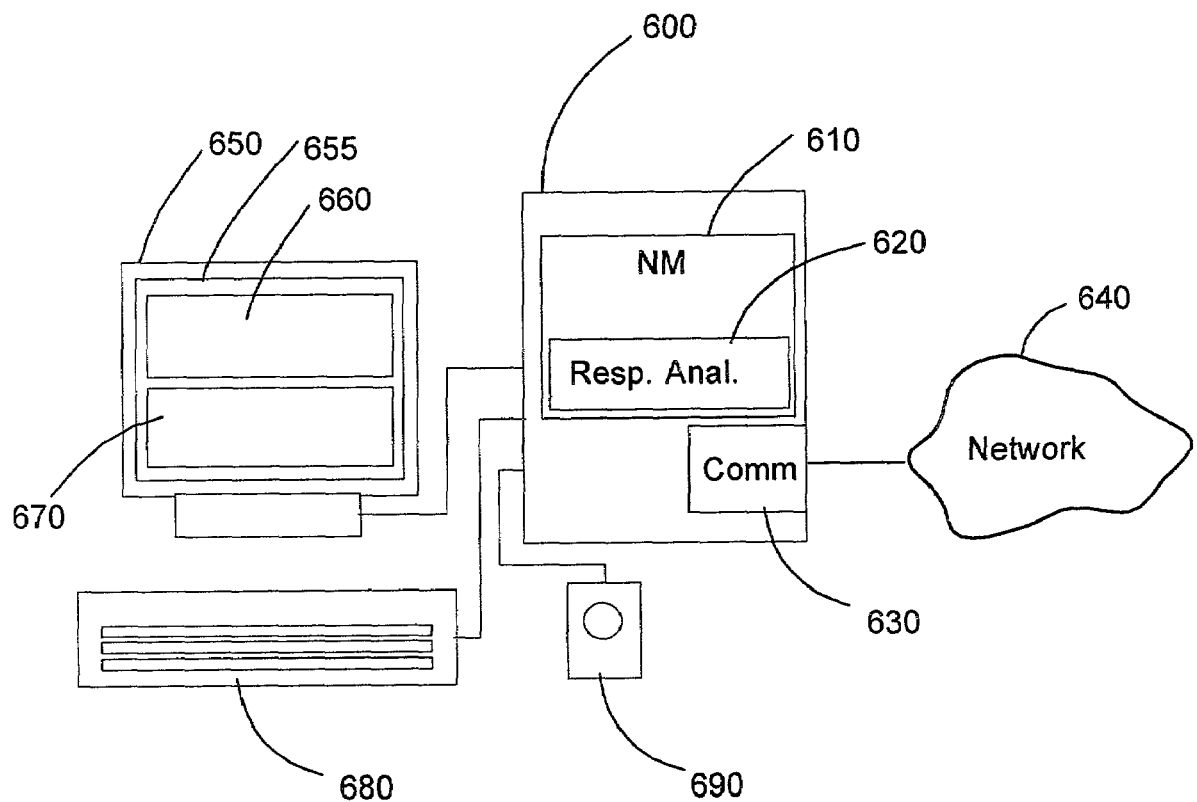
FIG. 6 is a schematic of an apparatus comprising an embodiment of the invention.

FIG. 6 is a schematic of an apparatus comprising an embodiment of the invention. The embodiment of FIG. 6 comprises a central processing unit (CPU) 600, a display device 650, a keyboard 680 and a mouse or trackball 690. CPU 600 may, for example, comprise a personal computer or computer workstation containing one or more processors that execute computer software program instructions. In the embodiment of FIG. 6, CPU 600 comprises computer program instructions for a network management system 610, which comprise computer program instructions 620 for analyzing messages received by CPU 600 via network communications interface 630, which connects CPU 600 to network 640.

Display device 660, which may, for example, comprise a CRT or LCD computer display device, comprises a display area 655 for displaying graphical and textual information to a user. Display area 655 may also comprise a touch screen or other mechanism for accepting input from a user. In the embodiment of FIG. 6, display area 655 is divided into two panes or windows 660 and 670. In one embodiment, window 660 comprises a discovery range window in which network address ranges for discovering network devices can be specified by a user and are displayed, while window 670 comprises a discovered devices window in which discovered devices are displayed and from which a user can select one or more of the listed devices for management. Display device 660 together with keyboard 680 and mouse or trackball 690 form a user interface that provides information to and accepts information from a user.

Thus, a method and apparatus for automatic discovery of network devices with data forwarding capabilities has been presented. Although the invention has been described using certain specific examples, it will be apparent to those skilled in the art that the invention is not limited to these few examples. For example, although the invention has been described with respect to network devices having IP forwarding capabilities, the invention is applicable to network devices having forwarding capabilities using other protocols as well, as for example, Multiple Protocol Label Switching ("MPLS"). Other embodiments utilizing the inventive features of the invention will be apparent to those skilled in the art, and are encompassed herein.

The invention claimed is:

1. A method for automatic discovery of network devices within a managed network comprising the steps of:
    selecting a first network address from a first set comprising a plurality of network addresses;
    sending a first message to said first network address requesting information about any device associated with said first network address;
    awaiting a first appropriate response to said first message;
    receiving a first appropriate response from a first device associated with said first network address;
    determining if said first device provides routing capabilities;
    if said first device provides routing capabilities, making said first device available for selection for management by a network management system;
    selecting a second address from said first set of network addresses;
    repeating said sending, and awaiting steps for said second network address.

2. The method of claim 1 further comprising the steps of:
    failing to receive a second appropriate response to a second message sent to said second address within a response time period;
    selecting a third network address from said first set of network addresses;
    repeating said sending and awaiting steps for said third network address.

3. The method of claim 1 wherein said first set of network addresses comprises a range of network addresses.

4. The method of claim 1 wherein said first set of network addresses comprises a list of network addresses.

5. The method of claim 1 further comprising the steps of:
selecting a fourth network address from a second set comprising a plurality of network addresses;
sending a fourth message to said fourth network address requesting information about any device associated with said fourth network address;
awaiting an appropriate response to said fourth message.

6. The method of claim 1 wherein said step of sending said first message comprises sending said first message using a network management protocol.

7. The method of claim 6 wherein said network management protocol comprises a Simple Network Management Protocol (SNMP).

8. The method of claim 1 wherein said step of receiving said first appropriate response to said first message comprises receiving a message comprising information about a type of said first device.

9. The method of claim 8 wherein said step of receiving said first appropriate response to said first message comprises receiving a message identifying said type of said first device as a device having data forwarding capabilities.

10. The method of claim 2 wherein said step of failing to receive said second appropriate response to said second message comprises receiving a message comprising information about a type of a second device associated with said second network address.

11. The method of claim 10 wherein said step of failing to receive said second appropriate response to said second message comprises receiving a message identifying said type of said second device as a device other than a device having data forwarding capabilities.

12. The method of claim 1 further comprising the step of obtaining configuration information for said first message prior to sending said first message.

13. The method of claim 12 wherein said step of obtaining said configuration information for said first message comprises obtaining said configuration information from said first set.

14. The method of claim 12 wherein said step of obtaining said configuration information for said first message comprises obtaining a response time period.

15. The method of claim 12 wherein said step of obtaining said configuration information for said first message comprises obtaining security parameters.

16. The method of claim 1 wherein said step of making said first device available for selection for management by a network management system comprises adding said first device to a set of discovered devices.

17. The method of claim 16 wherein said step of adding said first device to a set of discovered devices comprises the step of deleting an existing device associated with said first network address from said set of discovered devices prior to adding said first device to said set of discovered devices.

18. The method of claim 16 further comprising the step of displaying said set of discovered devices on a display device.

19. The method of claim 1 further comprising the step of creating said first set of network addresses.

20. The method of claim 19 wherein said step of creating said first set of network addresses comprises receiving a beginning network address and an ending network address.

21. The method of claim 19 wherein said step of creating said first set of network addresses comprises receiving a data file containing a plurality of discrete network addresses.

22. The method of claim 1 further comprising the steps of:
receiving a fifth message from a fifth device associated with a fifth network address;
making said fifth device available for selection for management by a network management system.

23. The method of claim 22 wherein said step of receiving said fifth message from said fifth device comprises receiving a SNMP message.

24. The method of claim 22 wherein said step of making said fifth device available for selection for management by a network management system comprises adding said fifth device to a set of discovered devices.

25. A method of managing from a network management system (NMS), network devices added to a communication network, comprising:
discovering from the NMS a network device newly connected to said communication network;
determining if said network device has routing capabilities;
if said network device has routing capabilities, adding the network device to a list of detected devices and setting the status of said network device in said list set to uncommitted; and
removing said network device from said list upon receiving confirmation that said network device should be managed from said NMS.

26. The method of claim 25 wherein said step of discovering comprises receiving at said NMS an SNMP notification from said network device upon connection to said communication network.

27. The method of claim 26 further comprising the steps of:
sending a request to network devices pertaining to a certain sub-network; and
receiving a response from said network device which identifies characteristics of said network device.

28. The method of claim 27 wherein said step of receiving said response comprises receiving a message comprising information about a type of said network device.

29. The method of claim 28 wherein said step of receiving said response comprises receiving a message identifying said type of said network device as a device having data forwarding capabilities.

30. The method of claim 27 wherein said step of sending the request to the network devices pertaining to a certain sub-network comprises sending the request to the network devices pertaining to a list of addresses.

31. The method of claim 27 wherein said step of adding is performed only if said network device has internet protocol (IP) forwarding capability.

32. The method of claim 27 wherein said step of adding is performed only if said network device has multiprotocol label switching (MPLS) capability.

33. The method of claim 27 wherein the step of receiving said response from said network device which identifies characteristics of said network device further comprises receiving the response from the network device which provides a description of the network device.

34. The method of claim 27 wherein the step of receiving said response from said network device which identifies characteristics of said network device further comprises receiving the response from the network device which provides an identification of the network device.

35. The method of claim 27 wherein the step of receiving said response from said network device which identifies characteristics of said network device further comprises receiving the response from the network device which identifies services capabilities of the network device.

36. The method of claim 27 wherein said step of sending comprises sending a SNMP request.

* * * * *